(12) United States Patent
Yu et al.

(10) Patent No.: US 11,980,133 B2
(45) Date of Patent: May 14, 2024

(54) GROUND INCLINATION STEREO PROFILING APPARATUS AND METHOD FOR MECHANICAL WEEDING COMPONENT

(71) Applicant: Nanjing Hongmao Agricultural Technology Co., Ltd, Jiangsu (CN)

(72) Inventors: ShanShan Yu, Jiangsu (CN); Shan Shan Wang, Jiangsu (CN)

(73) Assignee: NANJING HONGMAO AGRICULTURAL TECHNOLOGY CO., LTD, Jiangsu (CN)

( * ) Notice: Subject to any disclaimer, the term of this patent is extended or adjusted under 35 U.S.C. 154(b) by 0 days.

(21) Appl. No.: 18/460,375

(22) Filed: Sep. 1, 2023

(65) Prior Publication Data

US 2023/0403979 A1 Dec. 21, 2023

Related U.S. Application Data

(63) Continuation of application No. 18/023,279, filed as application No. PCT/CN2021/119133 on Sep. 17, 2021, now abandoned.

(30) Foreign Application Priority Data

Aug. 31, 2021 (CN) .......................... 202111012442.4

(51) Int. Cl.
*A01D 75/28* (2006.01)
*A01D 34/00* (2006.01)
*A01M 21/02* (2006.01)

(52) U.S. Cl.
CPC ......... *A01D 75/287* (2013.01); *A01D 34/006* (2013.01); *A01M 21/02* (2013.01)

(58) Field of Classification Search
CPC ... A01D 75/287; A01D 34/006; A01M 21/02; G05B 11/42; A01B 39/18; A01B 39/20
See application file for complete search history.

(56) References Cited

U.S. PATENT DOCUMENTS

| 4,641,490 | A | 2/1987 | Wynn et al. |
| 10,091,953 | B1 * | 10/2018 | Stagner ................. A01G 20/43 |

(Continued)

FOREIGN PATENT DOCUMENTS

| CN | 102308692 A | 1/2012 |
| CN | 209994821 U | 1/2020 |

(Continued)

OTHER PUBLICATIONS

Norremark et al., M. The Development and Assessment of the Accuracy of an Autonomous GPS-based System for Intra-Row Mechanical Weed Control in Row Crops, Google Scholar, ScienceDirect, Biosystems Engineering 101, pp. 396-410. (Year: 2008).*

(Continued)

*Primary Examiner* — Russell Frejd
(74) *Attorney, Agent, or Firm* — Muncy, Geissler, Olds & Lowe, P.C.

(57) ABSTRACT

The present invention discloses a ground inclination stereo profiling apparatus and method for a mechanical weeding component, and relates to the field of green agriculture. The ground inclination stereo profiling apparatus for the mechanical weeding component includes a rack assembly, an operation depth and inclination intelligent perception and feedback system, a hydraulic depth adjusting system and a control assembly. The operation depth and inclination intelligent perception and feedback system includes a depth synchronous crank-slider mechanism and an inclination synchronous crank-connecting rod mechanism for synchronously transmitting a depth change and horizontal inclination information of the weeding component; the control (Continued)

assembly includes a processor, a first angle sensor and a second angle sensor; the processor controls the hydraulic depth adjusting system and the motor assembly; and the hydraulic depth adjusting system conducts depth adjustment on the weeding component through a hydraulic cylinder.

6 Claims, 6 Drawing Sheets

(56) References Cited

U.S. PATENT DOCUMENTS

| | | | |
|---|---|---|---|
| 2016/0295796 | A1 | 10/2016 | Fischer |
| 2023/0021925 | A1* | 1/2023 | Du .................. A01D 41/06 |
| 2023/0309545 | A1* | 10/2023 | Bouten ............. A01M 21/02 |
| | | | 56/10.2 R |

FOREIGN PATENT DOCUMENTS

| | | |
|---|---|---|
| CN | 111903317 A | 11/2020 |
| CN | 112189443 A | 1/2021 |
| CN | 112293392 A | 2/2021 |
| JP | 2004-187638 A | 7/2004 |

OTHER PUBLICATIONS

Dedousis, A. An Investigation into the Design of Precision Weeding Mechanisms for Inter and Intra-Row Weed Control, Google Scholar, Cranfield University School of Applied Sciences, PHD Thesis, 265 pages. (Year: 2007).*

* cited by examiner

GROUND INCLINATION STEREO PROFILING APPARATUS AND METHOD FOR MECHANICAL WEEDING COMPONENT

CROSS REFERENCE TO RELATED APPLICATIONS

This application is a Continuation of application Ser. No. 18/023,279, filed on Feb. 24, 2023, now expressly abandoned, which is a U.S. National Stage Application of International Application No. PCT/CN2021/119133 filed on Sep. 17, 2021, which claims priority of Application No. 202111012442.4 filed in China on Aug. 31, 2021 under 35 U.S.C. § 119, the entire contents of all of which are hereby incorporated by reference.

TECHNICAL FIELD

The present invention relates to the field of green agriculture, in particular to a ground inclination stereo profiling apparatus and method for a mechanical weeding component.

BACKGROUND

Farmland weeds are an important reason for production reduction in agriculture and quality weakening. At present, chemical agents and manual weeding are mainly used in weeding. A chemical herbicide is prone to causing the problems that a human body is poisoned, a pesticide residue on an agricultural product exceeds the standard, the environment is polluted, a biologic chain is destructed and the like, while manual weeding is large in labor intensity, consumes great time and efforts and is low in efficiency. Mechanical weeding may increase the labor productivity, solves the problem of insufficient agricultural labor force, is beneficial to improving the agricultural production and the ecological environment, replaces a herbicide and reduces residues of the herbicide, improves the quality and the competitiveness of the agricultural product, and promotes more mechanically efficient, green and ecological agricultural production.

However, at present, an intertillage weeding machine for paddy fields is rarely applied, and due to uneven and soft grounds of farmlands, the weeding machine may be inclined and sink when walking. Meanwhile, during mechanical weeding operation, due to different hardnesses of soils in a working width, tilling depths of the weeding component are easily different, resulting in entire inclination of the weeding component; while mechanical weeding operation requires to maintain a certain operation depth and parallelism between the weeding component and the ground, so that if there is an inclination or sinking, the mechanical weeding quality cannot be guaranteed, and seedling damage and weeding omission are easily caused.

SUMMARY

In order to overcome the defects mentioned in Background, the objective of the present is to provide a ground inclination stereo profiling apparatus and method for a mechanical weeding component to weaken the effect of inclination and sinking on weeding quality when weeding machine walks in the field and improve the mechanical weeding quality.

The objective of the present invention may be implemented by the following technical solution:

A ground inclination stereo profiling apparatus for a mechanical weeding component includes a rack assembly, an operation depth and inclination intelligent perception feedback system, a sector gear transmission system, a hydraulic depth adjusting system, a motor assembly and a control assembly. The operation depth and inclination intelligent perception and feedback system includes a depth synchronous crank-slider mechanism for synchronously transmitting a depth change of the weeding component and an inclination synchronous crank-connecting rod mechanism for synchronously transmitting horizontal inclination information of the weeding component; the control assembly includes a processor, a first angle sensor and a second angle sensor; the processor controls the hydraulic depth adjusting system and the motor assembly; the hydraulic depth adjusting system conducts depth adjustment on the weeding component through a hydraulic cylinder; and the motor assembly controls the sector gear transmission system to drive the rack assembly to conduct horizontal inclination adjustment on the weeding component.

Further, the depth synchronous crank-slider mechanism includes trays, a first rack, a follower pin, a sliding plate, a first connecting rod, and the first angle sensor; the trays are uniformly distributed and fixedly connected to the lower side of the first rack; the follower pin is welded to the first rack; the sliding plate is fixed to the follower pin through nuts at two ends; the first connecting rod is articulated to the sliding plate through a transmission pin; a bearing pin of the first angle sensor is articulated to the first connecting rod through a transmission pin; and the first angle sensor is fixed to the first rack.

Further, the inclination synchronous crank-connecting rod mechanism includes the trays, the first rack, a second connecting rod, a rotating pair, a third connecting rod, a fourth connecting rod, and the second angle sensor; the second connecting rod is articulated to the first rack through a transmission pin; the rotating pair is fixed to the connecting rod and is mounted on the first rack through a bearing pin; the third connecting rod is articulated to the rotating pair through a transmission pin; the fourth connecting rod is articulated to the third connecting rod through a transmission pin; a bearing pin of the second angle sensor is articulated to the connecting rod through a transmission pin; and the second angle sensor is fixed to the first rack.

Further, the hydraulic depth adjusting system includes an electric hydraulic cylinder and suspension shafts; the suspension shafts are articulated to a three-point suspension frame of a walking chassis of an agricultural machine through a transmission pin; the bottom of the electric hydraulic cylinder is fixed to the three-point suspension frame; the top end of the electric hydraulic cylinder is fixed to a suspension beam; the depth synchronous crank-slider mechanism is configured to monitor a tilling depth value of an intertillage weeding component in real time and feed the tilling depth value back to the control unit; the control unit is configured to judge a depth target control signal according to a tilling depth threshold and a target depth value; and the depth target control signal employs a fuzzy PID control strategy to drive the electric hydraulic cylinder according to a crank-slider response model, thereby achieving stable closed-loop control on tilling depth of the intertillage weeding component.

Further, the sector gear transmission system includes a fifth connecting rod, a non-circular sector gear, a brushless motor, the suspension beam, and a second rack; the fifth connecting rod is articulated to the second rack; the non-circular sector gear is articulated to the fifth connecting rod through a transmission pin; the brushless motor is in transmission with the non-circular sector gear and fixed to the suspension beam; the suspension beam is mounted on the second rack through the bearing pin; the inclination synchronous crank-connecting rod mechanism is configured to monitor a horizontal inclination value of the intertillage weeding component in real time and feed the horizontal inclination value back to the control unit; the control unit is configured to judge an inclination target control signal according to an inclination threshold and an inclination value; and the inclination target control signal employs the fuzzy PID control strategy to drive the brushless motor according to a crank-connecting rod and non-circular sector gear transmission response model, thereby achieving stable closed-loop control on horizontal inclination of the intertillage weeding component.

A ground inclination stereo profiling method for a mechanical weeding component, executed by the ground inclination stereo profiling apparatus for the mechanical weeding component includes the following steps:

S1, conducting kinematic and kinetic analysis on a crank-slider type operation depth intelligent perception, feedback and control system and a crank-connecting rod type horizontal inclination intelligent perception, feedback and control system through the ground inclination stereo profiling apparatus for the mechanical weeding component;

S2, finding out response models and fuzzy PID regulation parameters of the crank-slider type operation depth intelligent perception, feedback and control system and the crank-connecting rod type horizontal inclination intelligent perception, feedback and control system under different excitations through numerical simulation and experimental analysis methods; and S3, designing a fuzzy PID control algorithm according to the response models and the fuzzy PID regulation parameters of the ground inclination stereo profiling apparatus for the mechanical weeding component under the excitations, so as to achieve closed-loop control on a balanced and stable state of ground inclination stereo profiling of the mechanical weeding component.

Further, an angle φ fed back by the first angle sensor, an angle change velocity ω, a crank length R and a connecting rod length L are all related to a motion analysis model of the depth synchronous crank-slider mechanism, with a relationship as follows:

$$S = R\left[1 - \cos\phi + \frac{1}{\lambda} - \frac{(1 - \lambda^2 \sin^2\phi)^{1/2}}{\lambda}\right]$$

$$V = R\omega\left[\sin\phi + \frac{\lambda \sin^2\phi}{2(1 - \lambda^2 \sin^2\phi)^{1/2}}\right]$$

$$\alpha = R\omega^2\left[\cos\phi + \frac{\lambda(\cos 2\phi + \lambda^2 \sin 4\phi)}{(1 - \lambda^2 \sin^2\phi)^{1/2}}\right],$$

in the formula, $$\lambda = \frac{R}{L},$$

S is an operation depth, V is an operation depth change velocity, and α is an operation depth change acceleration.

Further, an angle φ fed back by the second angle sensor, a driving pair crank length H, a connecting rod length Q and a driven pair rocker P are all related to a motion analysis model of the horizontal inclination synchronous crank-connecting rod mechanism, with a relationship as follows:

$$\Psi = \pi - \tan^{-1}\frac{H\sin\varphi}{1 - H\cos\varphi} - \cos^{-1}\frac{K^2 - 2H\cos\varphi}{2fP}$$

$$\frac{d\Psi}{dt} = \left[\frac{H(H - \cos\varphi)}{f^2} + \frac{H\sin\varphi}{s^2}\left(2 - \frac{M^2}{f^2}\right)\right]\frac{d\varphi}{dt}$$

$$\frac{d^2\Psi}{dt^2} = \left[\frac{H(H - \cos\varphi)}{f^2} + \frac{H\sin\varphi}{s^2}\left(2 - \frac{M^2}{f^2}\right)\right]\frac{d^2\varphi}{dt^2} +$$

$$\left\{\frac{H\sin\varphi}{f^2}\left[1 - \frac{2H(H - \cos\varphi)}{f^2}\right] - \frac{2H^2\sin^2\varphi}{s^2 f^2}\left(1 - \frac{M^2}{f^2}\right) + \right.$$

$$\left. \left(2 - \frac{M^2}{f^2}\right) \times \left[\frac{H\cos\varphi}{s^2} - \frac{2H^2\sin^2\varphi(2P^2 - M^2)}{s^6}\right]\right\}\left(\frac{d\varphi}{dt}\right)^2,$$

in the formula, ψ is a horizontal inclination angle of the weeding component, $$\frac{d\Psi}{dt}$$

is an angular velocity, $$\frac{d^2\Psi}{dt^2}$$

is angular acceleration, $f^2 = 1 + H^2 - 2H\cos\varphi$, $K = 1 + H^2 + P^2 - Q^2$, $M = K^2 - 2H\cos\varphi$ and $s^2 = \sqrt{4f^2P^2 - M^2}$.

Further, a second rack mounting length A, connecting rod lengths B, T and a sector gear rotation angle ξ are all related to a motion analysis model of the sector gear transmission system of the weeding component, with a relationship as follows:

$$\theta = \Omega - \cos^{-1}\frac{A^2 + B^2 - (C + T)^2}{2AB}$$

$$T^2 = l^2 + r^2 - 2lr\cos\xi,$$

in the formula, Ω, C, A, B, l and r are constants, depending on a mounting size and an initial state of the sector gear transmission system of the weeding component; and θ is an horizontal inclination angle.

The present invention has the beneficial effects that:
1. According to the present invention, the weed removal rate of an intertillage weeding component can be increased, and the seedling damage rate during the weeding operation can be reduced, thereby solving the problems of seedling damage and weeding omission due to inclination and sinking in operation engineering.
2. According to the present invention, a closed-loop control strategy of the tilling depth and horizontal inclination of the weeding component is beneficially found out.

BRIEF DESCRIPTION OF THE DRAWINGS

The present invention will be further described below in combination with the accompanying drawings.

Figure 1:
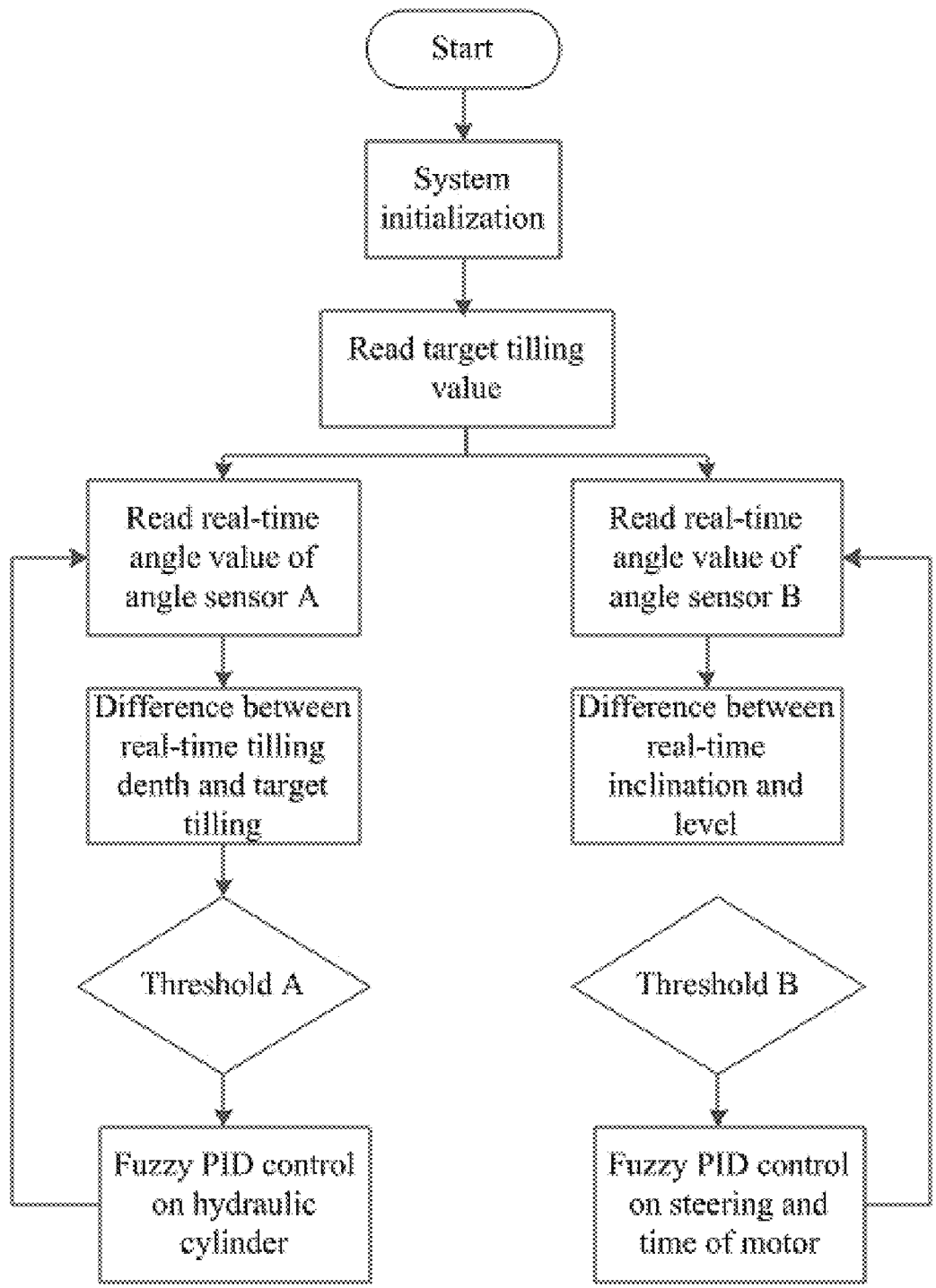
FIG. 1 is a control flowchart of the present invention.

Reference numerals: 1, tray; 2, first rack; 3, follower pin; 4, sliding plate; 5, first connecting rod; 6, first angle sensor; 7, second connecting rod; 8, rotating pair; 9, third connecting rod; 10, fourth connecting rod; 11, second angle sensor; 12, fifth connecting rod; 13, non-circular sector gear; 14, brushless motor; 15, suspension beam; 16, electric hydraulic cylinder; 17, suspension shaft; 18, second rack.

DETAILED DESCRIPTION OF THE EMBODIMENTS

The technical solutions in the embodiments of the present invention will be described clearly and completely in combination with the accompanying drawings in the embodiments of the present invention below. Apparently, the embodiments described are only a part of embodiments of the present invention, and are not all of embodiments thereof. All other embodiments that persons of ordinary skill in the art obtain without creative efforts based on the embodiments of the present invention also fall within the protection scope of the present invention.

In the descriptions of the present invention, it should be understood that the terms "opening", "upper", "lower", "thickness", "top", "middle", "length", "inner", "periphery" and the like indicate orientations or positional relationships, which are for convenience in description of the present invention and simplified description merely, but not for indicating or implying that the assemblies or elements referred to must have the specific orientations and constructed or operated in the specific orientations. Therefore, the terms cannot be understood as limiting of the present invention.

Figure 2:
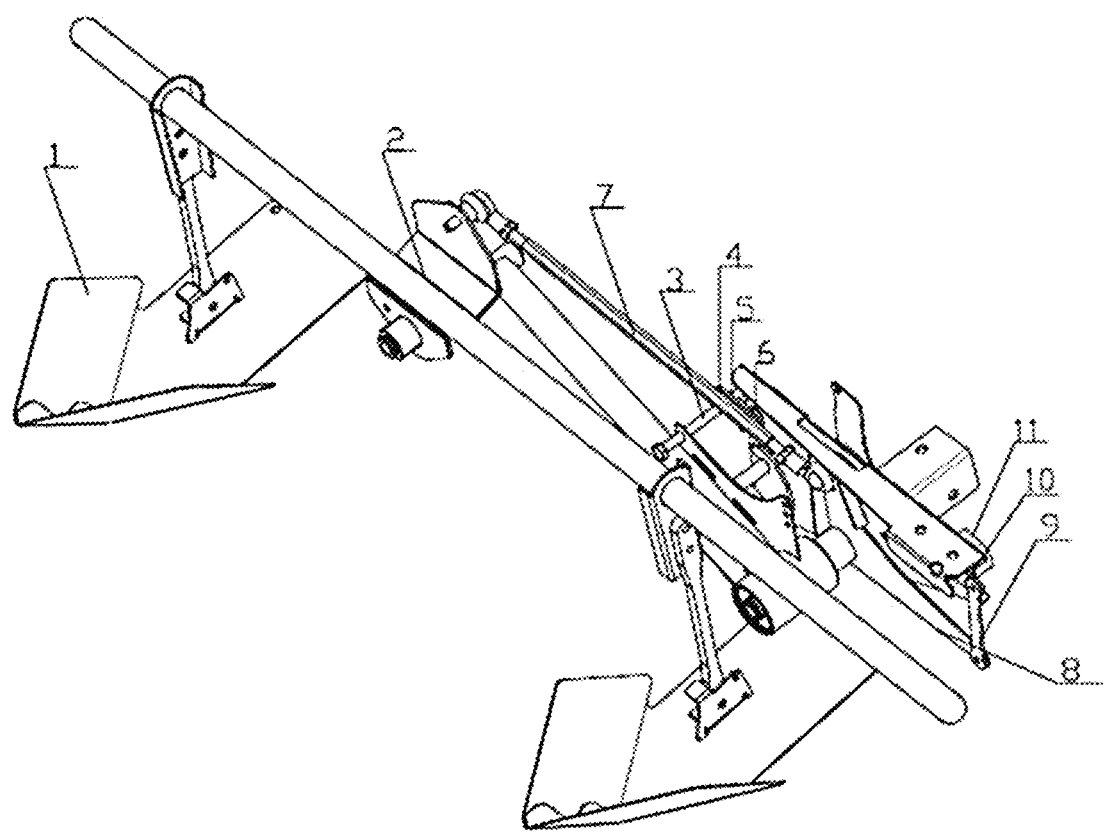
FIG. 2 is a structural schematic diagram of an operation depth and inclination intelligent perception and feedback system of the present invention.
Figure 3:
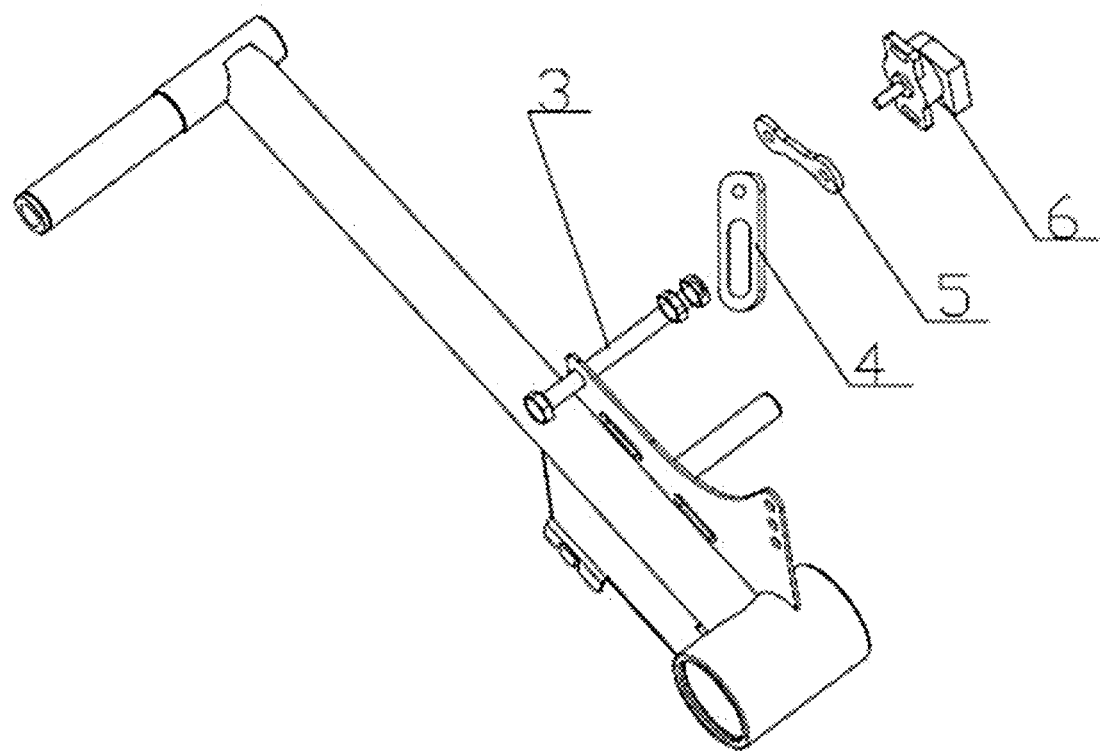
FIG. 3 is a structural schematic diagram of a tilling depth intelligent perception system of the present invention.
Figure 4:
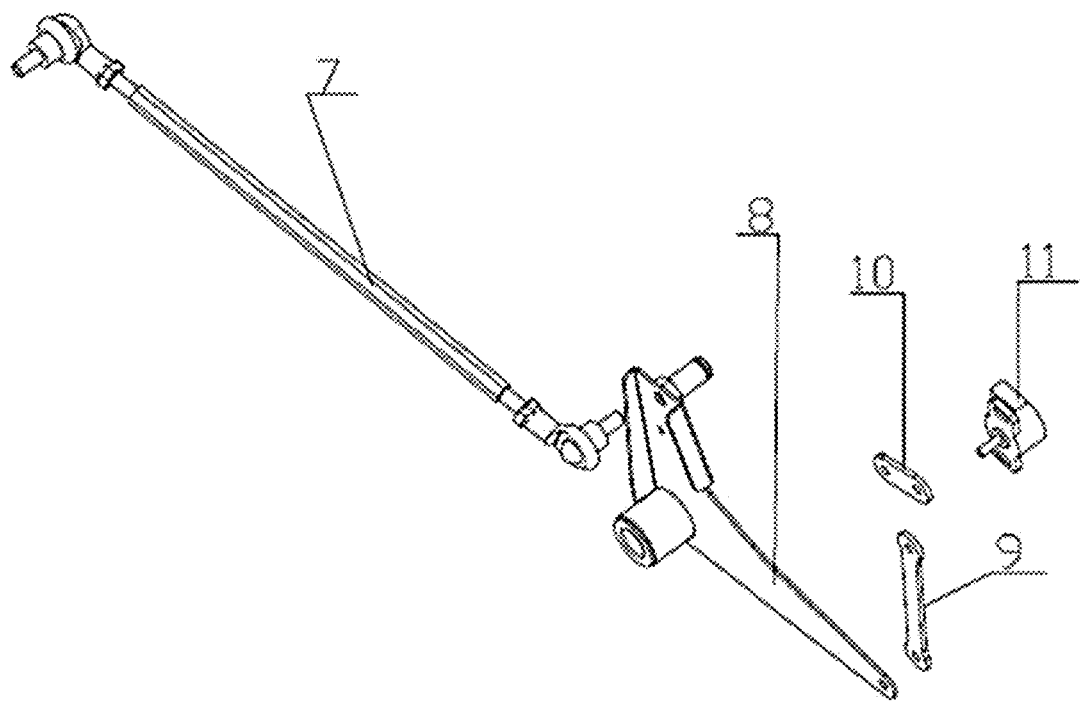
FIG. 4 is a structural schematic diagram of a horizontal inclination intelligent perception structure of the present invention.
Figure 5:
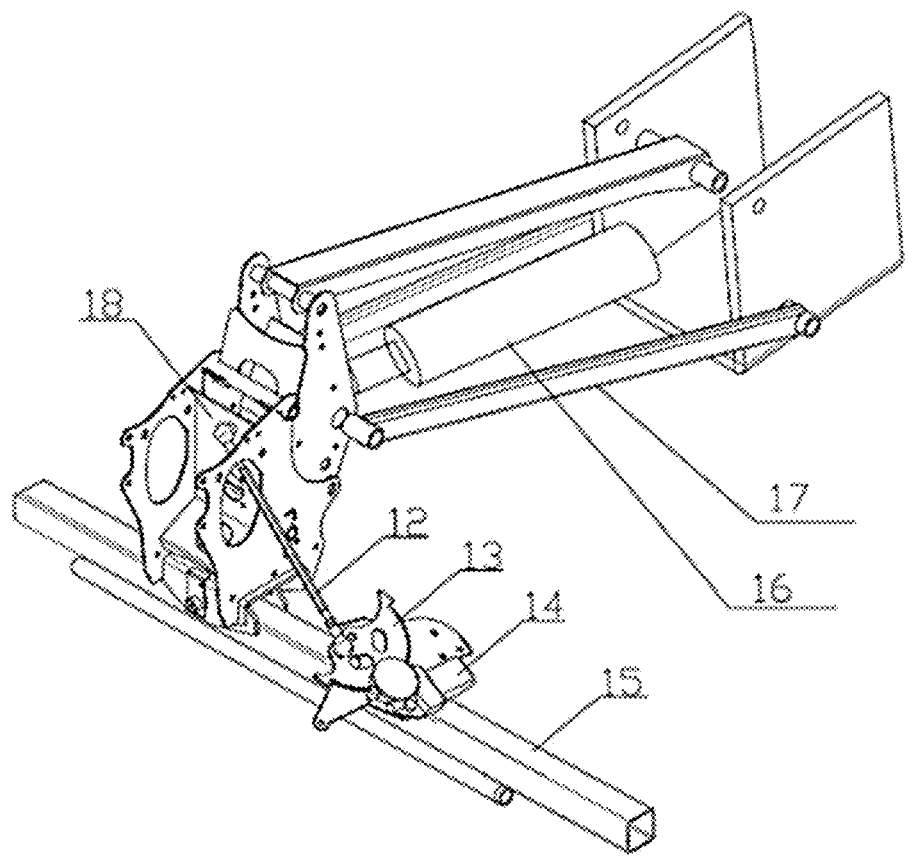
FIG. 5 is a structural schematic diagram of a profiling execution mechanism of the present invention.
Figure 6:
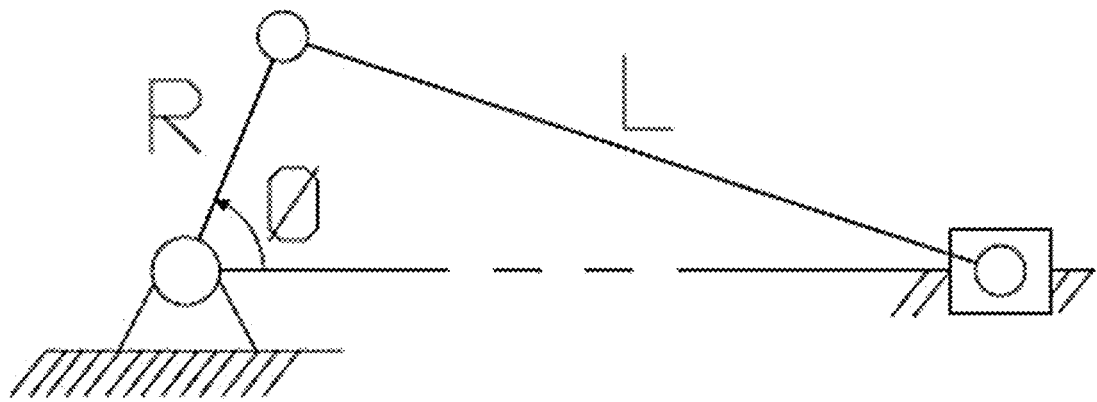
FIG. 6 is a principle diagram of a tilling depth intelligent perception model of the present invention.
Figure 7:
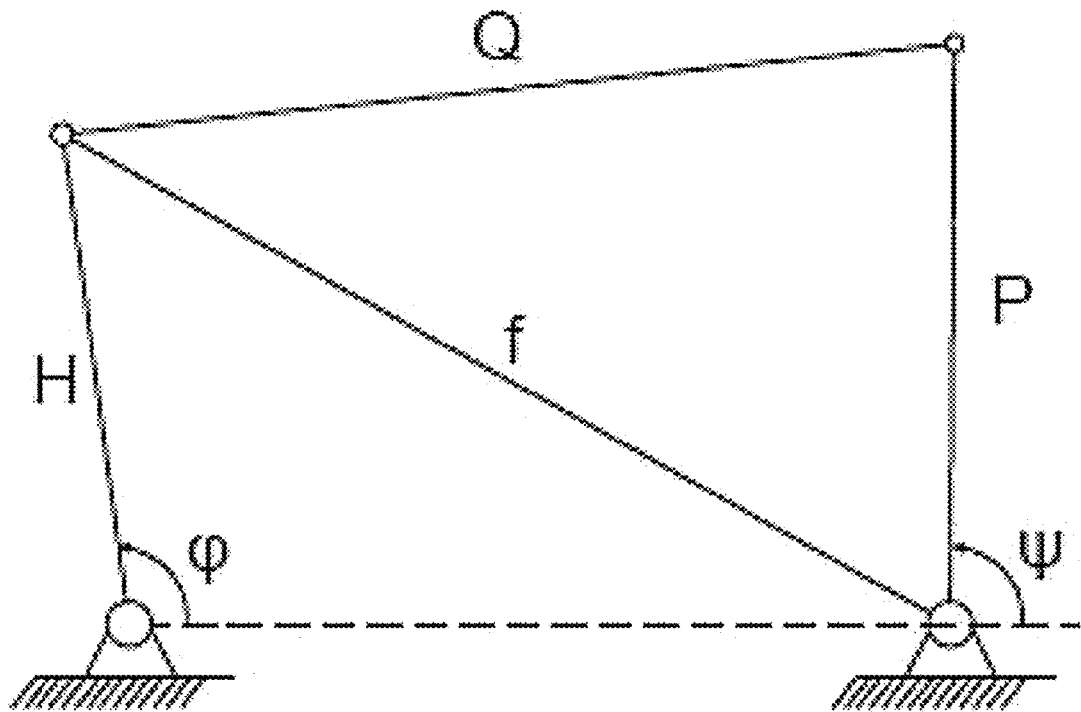
FIG. 7 is a principle diagram of a horizontal inclination intelligent perception model of the present invention.
Figure 8:
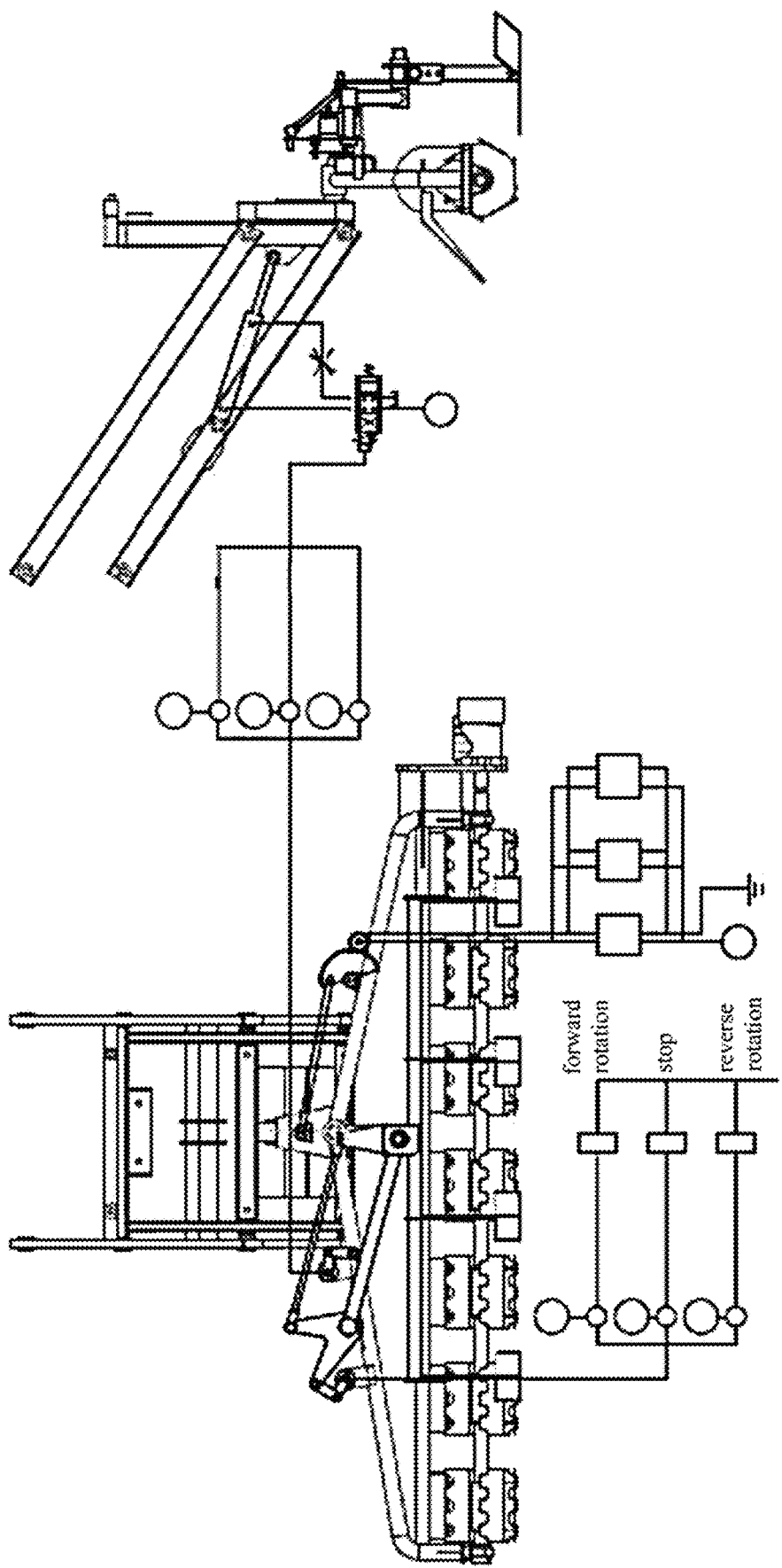
FIG. 8 is a structural schematic diagram of a tilling depth intelligent perception system of the present invention.
Figure 9:
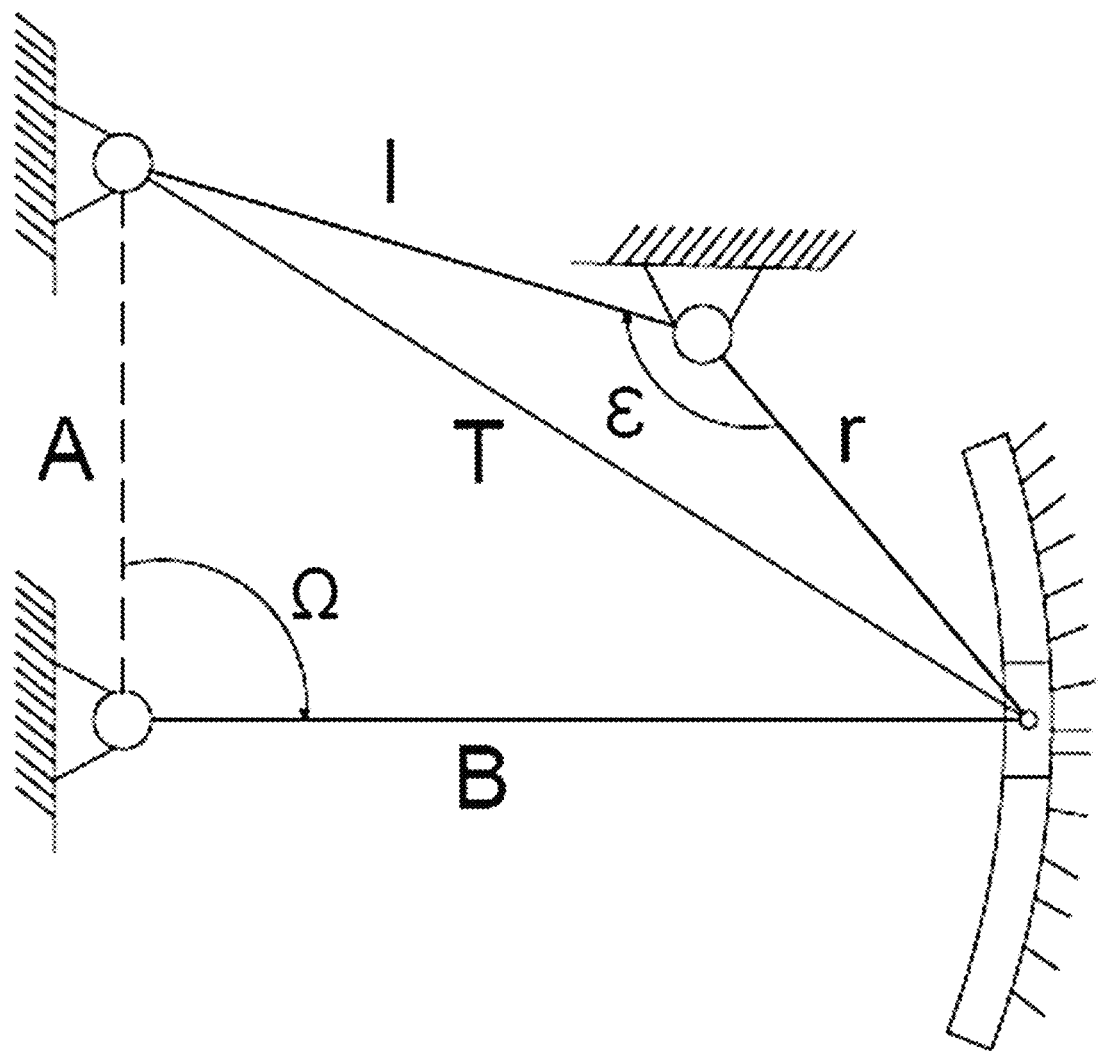
FIG. 9 is a principle diagram of horizontal inclination control of the present invention.

Disclosed is a ground inclination stereo profiling apparatus for a mechanical weeding component, as shown in FIGS. 1-9. For the present invention, the ground inclination stereo profiling apparatus for the mechanical weeding component may be mounted on a three-point suspension frame of a walking chassis of an agricultural machine (such as a rice transplanter, a tractor, and a high-clearance plant protection machine) through suspension shafts 17.

Trays 1, a rack 2, a follower pin 3, a sliding plate 4, a connecting rod 5 and an angle sensor A6 form a depth synchronous crank-slider mechanism; the trays 1 are uniformly distributed and fixedly connected to the lower side of the rack 2, and heights of the trays are synchronously changed along with an operation depth; the follower pin 3 is welded to the rack 2; the sliding plate 4 is fixed to the follower pin 3 through nuts at two ends; the connecting rod 5 is articulated to the sliding plate 4 through a transmission pin; a bearing pin of the angle sensor A6 is articulated to the connecting rod 5 through a transmission pin; the angle sensor A6 is fixed to the rack 2; and the depth synchronous crank-slider mechanism is configured to monitor a tilling depth value of an intertillage weeding component and a change thereof in real time and feed the tilling depth and the change back.

The trays 1, the rack 2, a connecting rod 7, a rotating pair 8, a connecting rod 9, a connecting rod 10 and an angle sensor B11 form an inclination synchronous crank-connecting rod mechanism; the connecting rod 7 is articulated to the rack 2 through a transmission pin; the rotating pair 8 is fixed to the connecting rod 7 in an articulating manner and mounted on the rack 2 through a bearing pin, and an angle of the rotating pair 8 is synchronously changed along with inclination of the operation component; the connecting rod 9 is articulated to the rotating pair 8 through a transmission pin; the connecting rod 10 is articulated to the connecting rod 9 through a transmission pin; a bearing pin of the angle sensor B11 is articulated to the connecting rod 10 through a transmission pin; the angle sensor B11 is fixed to the rack 2; and the inclination synchronous crank-connecting rod mechanism is configured to monitor a horizontal inclination value of the intertillage weeding component and a change thereof in real time and feed the horizontal inclination value and the change back.

An electric hydraulic cylinder 16 and suspension shafts 17 form a hydraulic depth adjusting system; the suspension shafts 17 are articulated to the three-point suspension frame of the walking chassis of the agricultural machine (such as the rice transplanter, the tractor, and the high-clearance plant protection machine) through transmission pins; the bottom of the electric hydraulic cylinder 16 is fixed to the three-point suspension frame; and the top end of the electric hydraulic cylinder 16 is fixed to a rack 18.

The depth synchronous crank-slider mechanism is configured to monitor a tilling depth value of the intertillage weeding component in real time and feed the tilling depth value back to a control unit; the control unit is configured to judge a depth target control signal according to a tilling depth threshold and a target depth value; and the depth target control signal employs a fuzzy PID control strategy to drive the electric hydraulic cylinder 16 according to a crank-slider response model, thereby achieving stable closed-loop control on tilling depth of the intertillage weeding component.

A connecting rod 12, a non-circular sector gear 13, a brushless motor 14, a suspension beam 15 and the rack 18 form a sector gear transmission system; the connecting rod 12 is articulated to the rack 18; the non-circular sector gear 13 is articulated to the connecting rod 12 through a transmission pin; the brushless motor 14 is in transmission with the non-circular sector gear 13 by being engaged with the non-circular sector gear and fixed to the suspension beam 15; the suspension beam 15 is mounted on the rack 18 through a bearing pin; the inclination synchronous crank-connecting rod mechanism is configured to monitor a horizontal inclination value of the intertillage weeding component in real time and feed the horizontal inclination value back to the control unit; the control unit is configured to judge an inclination target control signal according to an inclination threshold and an inclination value; and the inclination target control signal employs the fuzzy PID control strategy to drive the brushless motor 14 according to a crank-connecting rod and non-circular sector gear transmission response model, thereby achieving stable closed-loop control on horizontal inclination of the intertillage weeding component.

Kinematic and kinetic analysis is conducted on a crank-slider type operation depth intelligent perception, feedback and control system and a crank-connecting rod type horizontal inclination intelligent perception, feedback and control system through the ground inclination stereo profiling apparatus for the mechanical weeding component; and response models and fuzzy PID regulation parameters of the crank-slider type operation depth intelligent perception, feedback and control system and the crank-connecting rod type horizontal inclination intelligent perception, feedback and control system under different excitations are found out through numerical simulation and experimental analysis methods.

A ground inclination stereo profiling method for a mechanical weeding component includes the following steps: conducting kinematic and kinetic analysis on a crank-slider type operation depth intelligent perception, feedback and control system and a crank-connecting rod type horizontal inclination intelligent perception, feedback and control system through the ground inclination stereo profiling apparatus for the mechanical weeding component; finding out response models and fuzzy PID regulation parameters of the crank-slider type operation depth intelligent perception, feedback and control system and the crank-connecting rod type horizontal inclination intelligent perception, feedback and control system under different excitations through numerical simulation and experimental analysis methods; and designing a fuzzy PID control algorithm according to the response models and the fuzzy PID regulation parameters of the ground inclination stereo profiling apparatus for the mechanical weeding component under the excitations, so as to achieve closed-loop control on a balanced and stable state of ground inclination stereo profiling of the mechanical weeding component.

An angle φ fed back by the angle sensor A6, an angle change velocity ω, a crank length R and a connecting rod length L are all related to a motion analysis model of the depth synchronous crank-slider mechanism, with a relationship as follows:

$$S = R\left[1 - \cos\phi + \frac{1}{\lambda} - \frac{(1 - \lambda^2\sin^2\phi)^{1/2}}{\lambda}\right]$$

$$V = R\omega\left[\sin\phi + \frac{\lambda\sin^2\phi}{2(1 - \lambda^2\sin^2\phi)^{1/2}}\right]$$

$$a = R\omega^2\left[\cos\phi + \frac{\lambda(\cos 2\phi + \lambda^2\sin 4\phi)}{(1 - \lambda^2\sin^2\phi)^{1/2}}\right],$$

in the formula, $$\lambda = \frac{R}{L},$$

S is an operation depth, V is an operation depth change velocity, and a is an operation depth change acceleration.

The depth synchronous crank-slider mechanism and the angle sensor A6 are employed. The depth synchronous crank-slider mechanism transmits the depth changes of the weeding component synchronously; and the angle sensor A6 detects and feeds back depth information of the weeding component. The control assembly includes a processor and the angle sensor A6; the processor controls the hydraulic depth adjusting system according to the depth, detected and fed back by the angle sensor, of the weeding component; and the hydraulic depth adjusting system adjusts the depth of the weeding component by a hydraulic cylinder, so as to ensure that the weeding component always maintains a certain weeding depth with the ground.

An angle φ fed back by the angle sensor B11, a driving pair crank length H, a connecting rod length Q and a driven pair rocker P are all related to a motion analysis model of the horizontal inclination synchronous crank-connecting rod mechanism, with a relationship as follows:

$$\Psi = \pi - \tan^{-1}\frac{H\sin\varphi}{1 - H\cos\varphi} - \cos^{-1}\frac{K^2 - 2H\cos\varphi}{2fP}$$

$$\frac{d\Psi}{dt} = \left[\frac{H(H - \cos\varphi)}{f^2} + \frac{H\sin\varphi}{s^2}\left(2 - \frac{M^2}{f^2}\right)\right]\frac{d\varphi}{dt}$$

$$\frac{d^2\Psi}{dt^2} = \left[\frac{H(H - \cos\varphi)}{f^2} + \frac{H\sin\varphi}{s^2}\left(2 - \frac{M^2}{f^2}\right)\right]\frac{d^2\varphi}{dt^2} +$$

$$\left\{\frac{H\sin\varphi}{f^2}\left[1 - \frac{2H(H - \cos\varphi)}{f^2}\right] - \frac{2H^2\sin^2\varphi}{s^2f^2}\left(1 - \frac{M^2}{f^2}\right) +$$

$$\left(2 - \frac{M^2}{f^2}\right) \times \left[\frac{H\cos\varphi}{s^2} - \frac{2H^2\sin^2\varphi(2P^2 - M^2)}{s^6}\right]\right\}\left(\frac{d\varphi}{dt}\right)^2,$$

in the formula, ψ is a horizontal inclination angle of the weeding component, $$\frac{d\Psi}{dt}$$

is an angular velocity, $$\frac{d^2\Psi}{dt^2}$$

is angular acceleration, $f^2=1+H^2-2H\cos\varphi$, $K=1+H^2+P^2-Q^2$, $M=K^2-2H\cos\varphi$ and $s^2=\sqrt{4f^2P^2-M^2}$.

The inclination synchronous crank-connecting rod mechanism and the angle sensor B11 are employed. The inclination synchronous crank-connecting rod mechanism transmits the horizontal inclination information of the weeding component synchronously; and the angle sensor B11 detects and feeds back the horizontal inclination information of the weeding component. The control assembly includes a processor and the angle sensor B11; and according to the horizontal inclination information, detected and fed back by the angle sensor B11, of the weeding component, the processor controls the motor assembly to control the sector gear transmission system to drive the rack assembly for horizontal inclination adjustment on the weeding component, so as to ensure that the weeding component always maintains level to the ground.

A rack mounting length A, connecting rod lengths B, T and a sector gear rotation angle are all related to a motion analysis model of the sector gear transmission system of the weeding component, with a relationship as follows:

$$\theta = \Omega - \cos^{-1}\frac{A^2 + B^2 - (C+T)^2}{2AB}$$

$$T^2 = l^2 + r^2 - 2lr\cos\xi,$$

in the formula, Ω, C, A, B, l and r are constants, depending on a mounting size and an initial state of the sector gear transmission system of the weeding component; and θ is an horizontal inclination angle.

In the description of this specification, descriptions with reference to the terms "one embodiment", "an example", "a specific example", etc. mean that a particular feature, structure, material or characteristic described in connection with the embodiment or example is included in at least one embodiment or example of the present invention. In this specification, the schematic representations of the above terms do not necessarily refer to the same embodiment or example. Furthermore, the described particular features, structures, materials or characteristics may be combined in a suitable manner in any one or more embodiments.

The basic principles, main features and advantages of the present invention have been shown and described above. It should be understood by those skilled in the art that the present invention is not limited to the above embodiments, the above embodiments and the specification merely describe the principle of the present invention, and various changes and improvements can further be made for the present invention without departing from the spirit and scope of the present invention and all fall within the scope of the present invention as claimed.

What is claimed is:

1. A ground inclination stereo profiling apparatus for a mechanical weeding component, comprising a rack assembly, an operation depth and inclination intelligent perception feedback system, a sector gear transmission system, a hydraulic depth adjusting system, a motor assembly, and a control assembly, wherein the operation depth and inclination intelligent perception and feedback system comprises a depth synchronous crank-slider mechanism for synchronously transmitting a depth change of the weeding component and an inclination synchronous crank-connecting rod mechanism for synchronously transmitting horizontal inclination information of the weeding component; the control assembly comprises a processor, a first angle sensor and a second angle sensor; the processor controls the hydraulic depth adjusting system and the motor assembly; the hydraulic depth adjusting system conducts depth adjustment on the weeding component through a hydraulic cylinder; and the motor assembly controls the sector gear transmission system to drive the rack assembly to conduct horizontal inclination adjustment on the weeding component wherein the inclination synchronous crank-connecting rod mechanism comprises the trays, the first rack, a second connecting rod, a rotating pair, a third connecting rod, a fourth connecting rod, and the second angle sensor; the second connecting rod is articulated to the first rack through a transmission pin; the rotating pair is fixed to the connecting rod and is mounted on the first rack through a bearing pin; the third connecting rod is articulated to the rotating pair through a transmission pin; the fourth connecting rod is articulated to the third connecting rod through a transmission pin; a bearing pin of the second angle sensor is articulated to the connecting rod through a transmission pin; and the second angle sensor is fixed to the first rack.

2. The ground inclination stereo profiling apparatus for the mechanical weeding component according to claim 1, wherein the sector gear transmission system comprises a fifth connecting rod, a non-circular sector gear, a brushless motor, the suspension beam, and a second rack; the fifth connecting rod is articulated to the second rack; the non-circular sector gear is articulated to the fifth connecting rod through a transmission pin; the brushless motor is in transmission with the non-circular sector gear and fixed to the suspension beam; the suspension beam is mounted on the second rack through a bearing pin; the inclination synchronous crank-connecting rod mechanism is configured to monitor a horizontal inclination value of the intertillage weeding component in real time and feed the horizontal inclination value back to the control unit; the control unit is configured to judge an inclination target control signal according to an inclination threshold and an inclination value; and the inclination target control signal employs the fuzzy PID control strategy to drive the brushless motor according to a crank-connecting rod and non-circular gear transmission response model, thereby achieving stable closed-loop control on horizontal inclination of the intertillage weeding component.

3. A ground inclination stereo profiling method for a mechanical weeding component, executed by the ground inclination stereo profiling apparatus for the mechanical weeding component according to claim 1, comprising the following steps:

S1, conducting kinematic and kinetic analysis on a crank-slider type operation depth intelligent perception, feedback and control system and a crank-connecting rod type horizontal inclination intelligent perception, feedback and control system through the ground inclination stereo profiling apparatus for the mechanical weeding component;

S2, finding out response models and fuzzy PID regulation parameters of the crank-slider type operation depth intelligent perception, feedback and control system and the crank-connecting rod type horizontal inclination intelligent perception, feedback and control system under different excitations through numerical simulation and experimental analysis methods; and S3, designing a fuzzy PID control algorithm according to the response models and the fuzzy PID regulation parameters of the ground inclination stereo profiling apparatus for the mechanical weeding component under the excitations, so as to achieve closed-loop control on a balanced and stable state of ground inclination stereo profiling of the mechanical weeding component.

4. The ground inclination stereo profiling method for the mechanical weeding component according to claim 3, wherein an angle φ fed back by the first angle sensor, an angle change velocity ω, a crank length R and a connecting rod length L are all related to a motion analysis model of the depth synchronous crank-slider mechanism, with a relationship as follows:

$$S = R\left[1 - \cos\phi + \frac{1}{\lambda} - \frac{(1 - \lambda^2\sin^2\phi)^{1/2}}{\lambda}\right]$$

$$V = R\omega\left[\sin\phi + \frac{\lambda\sin 2\phi}{2(1 - \lambda^2\sin^2\phi)^{1/2}}\right]$$

-continued
$$\alpha = R\omega^2\left[\cos\phi + \frac{\lambda(\cos2\phi + \lambda^2\sin4\phi)}{(1-\lambda^2\sin^2\phi)^{1/2}}\right],$$

in the formula, $$\lambda = \frac{R}{L},$$

S is an operation depth, V is an operation depth change velocity, and $\alpha$ is an operation depth change acceleration.

5. The ground inclination stereo profiling method for the mechanical weeding component according to claim 3, wherein an angle φ fed back by the second angle sensor, a driving pair crank length H, a connecting rod length Q and a driven pair rocker P are all related to a motion analysis model of the horizontal inclination synchronous crank-connecting rod mechanism, with a relationship as follows:

$$\Psi = \pi - \tan^{-1}\frac{H\sin\varphi}{1-H\cos\varphi} - \cos^{-1}\frac{K^2-2H\cos\varphi}{2fP}$$

$$\frac{d\Psi}{dt} = \left[\frac{H(H-\cos\varphi)}{f^2} + \frac{H\sin\varphi}{s^2}\left(2-\frac{M^2}{f^2}\right)\right]\frac{d\varphi}{dt}$$

$$\frac{d^2\Psi}{dt^2} = \left[\frac{H(H-\cos\varphi)}{f^2} + \frac{H\sin\varphi}{s^2}\left(2-\frac{M^2}{f^2}\right)\right]\frac{d^2\varphi}{dt^2} +$$

$$\left\{\frac{H\sin\varphi}{f^2}\left[1-\frac{2H(H-\cos\varphi)}{f^2}\right] - \frac{2H^2\sin^2\varphi}{s^2f^2}\left(1-\frac{M^2}{f^2}\right) + \right.$$

$$\left.\left(2-\frac{M^2}{f^2}\right)\times\left[\frac{H\cos\varphi}{s^2} - \frac{2H^2\sin^2\varphi(2P^2-M^2)}{s^6}\right]\right\}\left(\frac{d\varphi}{dt}\right)^2,$$

in the formula, ψ is a horizontal inclination angle of the weeding component, $$\frac{d\Psi}{dt}$$

is an angular velocity, $$\frac{d^2\Psi}{dt^2}$$

is angular acceleration, $f^2=1+H^2-2H\cos\varphi$, $K=1+H^2+P^2-Q^2$, $M=K^2-2H\cos\varphi$ and $s^2=\sqrt{4f^2P^2-M^2}$.

6. The ground inclination stereo profiling method for the mechanical weeding component according to claim 3, wherein a second rack mounting length A, connecting rod lengths B, T and a sector gear rotation angle ξ are all related to a motion analysis model of the sector gear transmission system of the weeding component, with a relationship as follows:

$$\theta = \Omega - \cos^{-1}\frac{A^2+B^2-(C+T)^2}{2AB}$$

$$T^2 = l^2 + r^2 - 2lr\cos\xi,$$

in the formula, Ω, C, A, B, l and r are constants, depending on a mounting size and an initial state of the sector gear transmission system of the weeding component; and θ is a horizontal inclination angle.

* * * * *